US009573053B2

(12) United States Patent
Aoki et al.

(10) Patent No.: US 9,573,053 B2
(45) Date of Patent: Feb. 21, 2017

(54) AUGMENTED REALITY FOR TABLE GAMES

(71) Applicant: WMS Gaming, Inc., Waukegan, IL (US)

(72) Inventors: Dion K. Aoki, Chicago, IL (US); Mark B. Gagner, West Chicago, IL (US); Sean P. Kelly, Chicago, IL (US); Nickey C. Shin, Chicago, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 393 days.

(21) Appl. No.: 13/631,115

(22) Filed: Sep. 28, 2012

(65) Prior Publication Data

US 2013/0083066 A1 Apr. 4, 2013

Related U.S. Application Data

(60) Provisional application No. 61/541,630, filed on Sep. 30, 2011.

(51) Int. Cl.
A63F 9/24 (2006.01)
A63F 13/00 (2014.01)
G06F 17/00 (2006.01)
G06F 19/00 (2011.01)
A63F 13/213 (2014.01)
(Continued)

(52) U.S. Cl.
CPC ............. *A63F 13/213* (2014.09); *A63F 13/92* (2014.09); *G06F 3/011* (2013.01); *G06T 7/004* (2013.01); *G06T 19/006* (2013.01); *G07F 17/322* (2013.01); *G07F 17/3211* (2013.01); *H04L 67/38* (2013.01); *H04M 1/72544* (2013.01); *G06T 2207/30244* (2013.01);
(Continued)

(58) Field of Classification Search
CPC .. G07F 17/32; G07F 17/3225; G07F 17/3237; G07F 17/10; G07F 17/3241; G06T 19/006; G06T 7/00
See application file for complete search history.

(56) References Cited

U.S. PATENT DOCUMENTS 8,547,401 B2 * 10/2013 Mallinson et al. ........... 345/633
8,681,197 B2 * 3/2014 Sunahara ................... 348/14.01
(Continued)

FOREIGN PATENT DOCUMENTS

JP  2005-168664 A1  † 6/2005
JP  2009-055943 A   † 3/2009
JP  2009-066233 A   † 4/2009

Primary Examiner — Milap Shah
Assistant Examiner — Jason Pinheiro
(74) Attorney, Agent, or Firm — DeLizio Law, PLLC

(57) ABSTRACT

A method includes acquiring media content of a wagering game table at a wagering game establishment with a camera of a mobile device. A location of the mobile device is determined when the media content is acquired. A direction that a lens of the camera is facing when the media content is acquired is determined. The wagering game table is identified based on the location and the direction. Overlay imagery derived from wagering game activity of the wagering game table is downloaded into the mobile device from a server. The overlay imagery is composited onto the media content to create a composited media content. The composited media content is displayed on a display of the mobile device.

19 Claims, 8 Drawing Sheets

(51) Int. Cl.
*G06T 19/00* (2011.01)
*A63F 13/92* (2014.01)
*G06F 3/01* (2006.01)
*H04L 29/06* (2006.01)
*G07F 17/32* (2006.01)
*G06T 7/00* (2006.01)
*H04M 1/725* (2006.01)

(52) U.S. Cl.
CPC .... *H04M 1/72569* (2013.01); *H04M 1/72572* (2013.01); *H04M 2250/52* (2013.01)

(56) References Cited

U.S. PATENT DOCUMENTS

2009/0088243 A1* 4/2009 Gagner et al. ................. 463/25
2011/0065496 A1* 3/2011 Gagner et al. ................. 463/25
2011/0306400 A1* 12/2011 Nguyen ........................ 463/20

\* cited by examiner
† cited by third party

AUGMENTED REALITY FOR TABLE GAMES

RELATED APPLICATIONS

This application claims the priority benefit of U.S. Provisional Application Ser. No. 61/541,630 filed Sep. 30, 2011.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2012, WMS Gaming, Inc.

FIELD

Embodiments of the inventive subject matter relate generally to wagering game systems, and more particularly to wagering game systems that include augmented reality of wagering game tables.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into six sections. The first section provides an introduction to some example embodiments, while the second section describes example mobile device architectures. The third section describes different overlaid media content examples, according to some example embodiments, and the fourth section describes example operations performed by some embodiments. The fifth section describes wagering game machine architectures and wagering game networks and the sixth section presents some general comments.

Introduction

This section provides an introduction to some example embodiments that use mobile devices to augment wagering game activities. A mobile device can be any type of portable computer device, including a cellular telephone, a Personal Digital Assistant (PDA), smartphone, etc. The mobile device can comprise a display, a Global Positioning System (GPS) module, a compass, one or more cameras and various other input/output (I/O) components. In some example embodiments, the mobile device can also be a wager game device.

Wagering game systems offer wagering game players ("players") entertainment value and the opportunity to win monetary value. In some embodiments, wagering game systems may include wagering table games ("table games") comprising wagering games that are played on a table and are managed by one or more dealers, e.g., blackjack, poker, roulette, craps, Texas hold'em, etc.

The mobile device is used to provide an augmented reality for various wagering game environments, to provide various locations for monitoring wagering game activities, to facilitate wagering at table games, and more. The mobile device captures imagery, sound, location information, or any other media content in a wagering game environment, at a table game, etc. The mobile device then superimposes an overlay imagery onto the captured media content. The overlay imagery can be text, pictures, video, or any combination thereof. The overlay imagery can be graphics or text viewable by a user of the mobile device. The overlay imagery can also be an interface (e.g., Graphical User Interface) to which the user can input data (e.g., wagers, side betting, etc.).

Figure 1:
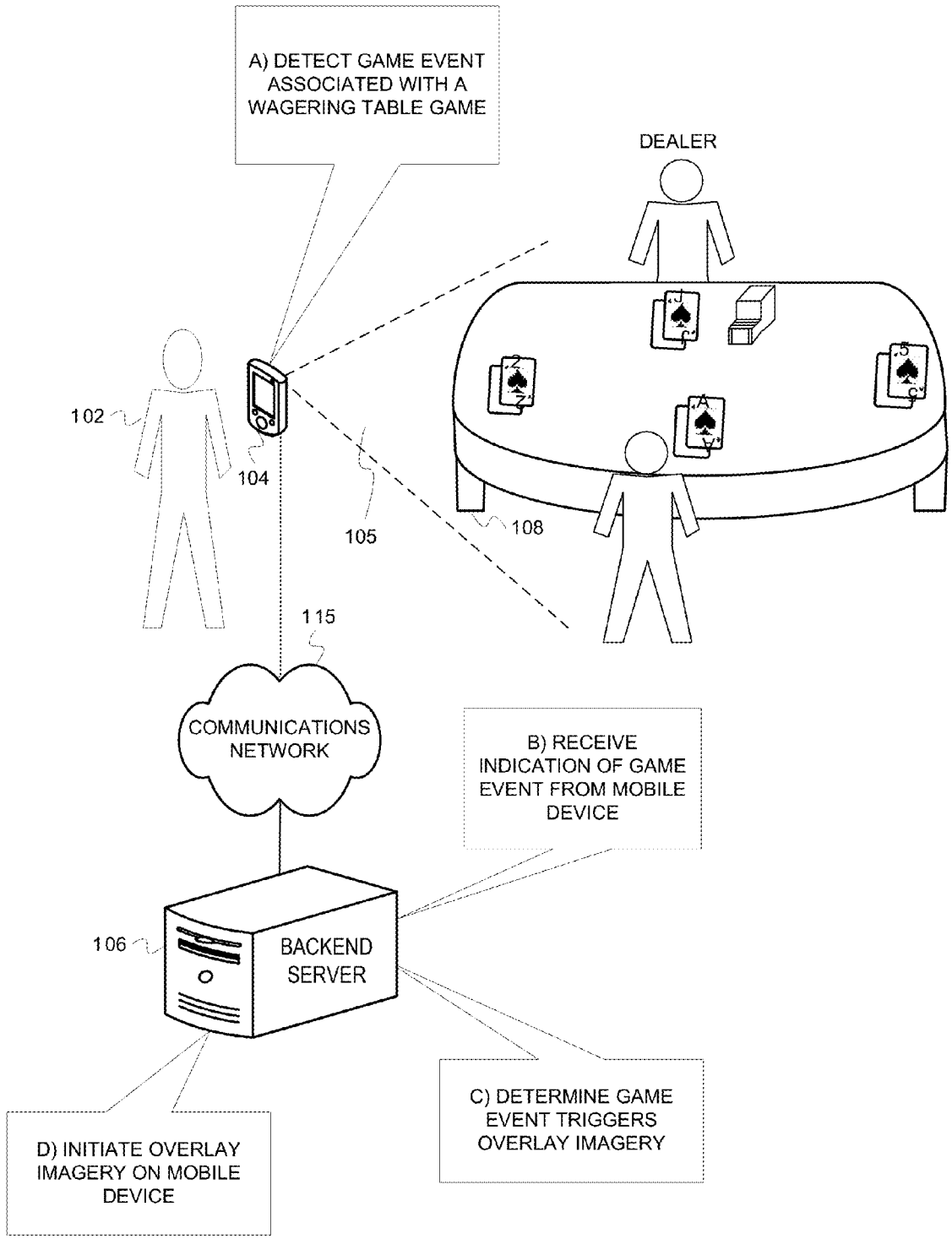
FIG. 1 is a diagrammatic illustration of a wagering game configuration for providing augmented reality, according to some example embodiments.

FIG. 1 is a diagrammatic illustration of a wagering game configuration for providing augmented reality, according to some example embodiments. FIG. 1 includes a player 102 using a mobile device 104. The mobile device 104 includes a camera (not shown in FIG. 1) that is capturing media content 105 (e.g., a still image or motion video) of a wagering game table 108. It is noted that although one example of a wagering game table for blackjack is shown in FIG. 1, the wagering game configuration can include wagering game tables for other table games (e.g., poker, roulette, craps, Texas hold'em, etc.). As further described below, the captured media content can be of various objects at wagering game environments, at locations offsite from a wagering game environment for monitoring wagering game activities, at various resort amenities, etc. FIG. 1 also includes a backend server 106 that represents any number of servers (e.g., wagering game server, account server, etc.). As shown, the mobile device 104 can communicate with the server 106.

In some instances, the mobile device 104 communicates wirelessly to the backend server 106, whereas the wagering game table 108 may communicate wirelessly or over a wire to the server 106.

In some example embodiments, the mobile device 104 uses the captured media content (e.g., a photo of the wagering game table 108) and overlay images (e.g., text) to provide an augmented reality associated with the wagering game table 108. For a wagering game table, the overlay imagery can include data about past activities of the specific wagering game, data about the players currently playing at the specific wagering game table, data about the state of the wagering game being currently played at the wagering game table, etc. For example, data about past wagering game activities can identify when the last time the dealer had a streak of busts, the frequency of hitting blackjack at this wagering game table, etc.

The overlay imagery can also suggest trends or "hot zones" on a wagering game table, such as craps or roulette. Thus, the augmented reality environment can drive players to make certain wagers. For example, assume that the captured media content is of a wagering game table where roulette is being played. The overlay imagery can identify that certain numbers have not been hit lately and thus according to some, might be due to hit. Contrastingly, the overlay imagery could show on a wagering game table where craps is being played that certain wagers have recently hit more frequently than statistically expected. It would then follow that certain players would likely avoid (or be more attracted to) these wagers for some period of time.

In another example, the overlay imagery can provide information on a particular player currently wagering at the wagering game table. For instance, the player's past wagering game activity can be show their propensity to take or decline cards based on certain hands, their last several rolls of dice, etc. In some example embodiments, a backend server can retrieve the player's wagering game activity from a player tracking account maintained by the casino. Such an account can be a casino-based account and/or an online account for the player.

In some embodiments, the overlay imagery can enable side wagering or betting relative to the wagering game table of which media content is captured. Accordingly, the overlay imagery enables the player 102 to input bets relative to a game currently being played on the wagering game table 108. Such an embodiment can allow game play when all seats are occupied by other players.

The overlay imagery can also provide, on the mobile device, virtual instances of games being played on the wagering game table 108 whose image is captured. Accordingly, the player can use virtual game instances to play games being played on a wagering game table for which media content is captured. Thus, wagering game activities on the mobile device can be independent of the activities occurring at the wagering game table.

In another application, the overlay imagery can provide instructions for strategy for the wagering game being played at the wagering game table. For example, if the wagering game comprises poker, the overlay imagery can include instructions on which cards to discard, whether to fold, etc. based on the hand being displayed on the wagering game table. Such imagery can be used relative to side betting on the wagering game being played, learning how to play, etc.

The overlay imagery can also be a language translation of the wagering game. Accordingly, if the language of the dealer of the wagering game machine is English, the overlay imagery can be Japanese, Chinese, German, etc. In particular, the language can be specific to the player 102 using the mobile device 104. Also, the translation can be audio or text, or a combination thereof.

In some example embodiments, the player 102 can use augmented reality to place wagers on a wagering game table. Certain table games such as craps and roulette often have expansive playing surfaces and certain betting locations may be difficult to access based on where the player is situated. In some instances, players could use the overlay imagery on the device to send activation instructions to the dealer or table (e.g., in the case of an electronic table as discussed below) to initiate certain wagers on the wagering game table.

In another application, the user of the mobile device 104 can utilize the device's internal accelerometer, gyroscope, compass, etc. to effectuate different virtual movements of the device relative to the wagering game table. For example, if the captured media content comprises a certain area of the wagering game table surface, the mobile device 104 can then output overlay imagery that reveals one or more "easter egg" prizes such as a virtual asset or even perhaps an exclusive alternate wager opportunity.

Also, for any of the above-referenced applications and embodiments, such applications and embodiments can be tailored for a specific wagering game establishment and/or users of the mobile device 104. In particular, more or less information can be provided via the overlay imagery based on the specific wagering game establishment and/or user of the mobile device 104. For example, the back end server 106 and mobile device 104 can provide richer overlay information for high-value patrons, as compared to other patrons.

In some example embodiments, casino operators can use the mobile device 104 at wagering game establishments. Accordingly, the overlay imagery can include statistics about the wagering game being played at the wagering game table. For example, the statistics can include the amount of wagering game activity or inactivity, the payouts, the number and types of wagering game players, etc. for a given time period (e.g., the current day, last hour, etc.).

Also, for operator usage, the overlay imagery can include an identification of the wagering game player(s) currently playing at a wagering game table. The overlay imagery can include the amount of money the player has spent for a given time period, if the player is having a winning trend or losing trend, and more. For example, if the player is a "big spender" that is currently in a losing trend, the overlay imagery can be a picture of a whale with a red down arrow. In such a situation, the operator can provide free "comps" for the player. For example, the operator can remotely communicate with a backend server to issue a number of credits to an account for the wagering game player. The operator can also issue, to the account, a free night stay at the hotel, free dinner, etc. Also, for operator usage, the captured media can include part of casino's gaming floor. Accordingly, the overlay imagery can include video or data about traffic patterns for that part of the gaming floor.

In one implementation, at stage A, the mobile device 104 detects a game event associated with a wagering table game being played by a plurality of players and managed by a dealer. A game event can be the act of dealing the cards and/or certain card combinations for card table games, the act of rolling the dice and/or certain dice combinations for dice table games, the act of spinning the roulette wheel or certain roulette wheel results, specific bet amounts, other table game results (e.g., award amounts), number of wins in a row, etc. At stage B, the backend server 106 receives an indication of the game event from the mobile device 104. For example, in a blackjack game, the mobile device 104 can send a message to the backend server 106 indicating that the cards have been dealt for the wagering game table, and/or may provide an indication of the suit and rank of each card dealt to each of the players.

At stage C, the backend server 106 determines that the game event triggers an overlay imagery as discussed above. In one example, the backend server 106 determines that the act of dealing the cards (e.g., blackjack cards) triggers a side game where each player can place side bets on the wagering game, e.g., bet whether one of the other players is going to win with the current hand, or trigger a system wide progressive game for all the players at the wagering game table 108. In another example, the backend server 106 determines that one or more of the hands that were dealt to the players trigger a bonus game for all the players on the wagering game table 108. It is noted, however, that the presentation for the side games is being communicated to the player via the overlay images on the mobile device 104. Accordingly, at stage D, the backend server 106 initiates the secondary game for presentation at the mobile device 104. The mobile device 104 detects player input associated with the secondary game, communicates with the backend server 106 to determine the secondary game results, and presents the secondary game results to the players via the mobile device 104. It is noted that the wagering game table 108 and the mobile device 104 can work together such that the mobile device 104 can be operated as a thin, thick, or intermediate client, as further described below.

In some embodiments, the wagering game tables 108 of the wagering game configuration may also comprise electronic wagering game tables, or e-tables, for playing wagering table games. In one example, the e-table includes a main display area to present the wagering table game to a plurality of players. The e-table can also include player displays within the main display area. For instance, the main display area can be one or more display devices with multitouch capabilities. In another example, the e-table can include player displays that are separate from the main display area. In some examples, the e-table can comprise a mechanism to display a holographic image of the wagering table game to the plurality of players. For table games that typically require a dealer, e.g., blackjack, the e-table can include a virtual dealer. Similar to the example described above in FIG. 1, the mobile device can detect table game events (i.e., via software instead of, or in addition to, capturing imagery), communicate with the backend server 106, and present overlay content to the player's mobile device.

Although FIG. 1 describes some embodiments, the following sections describe many other features and embodiments.

Mobile Device Architecture

Figure 2:
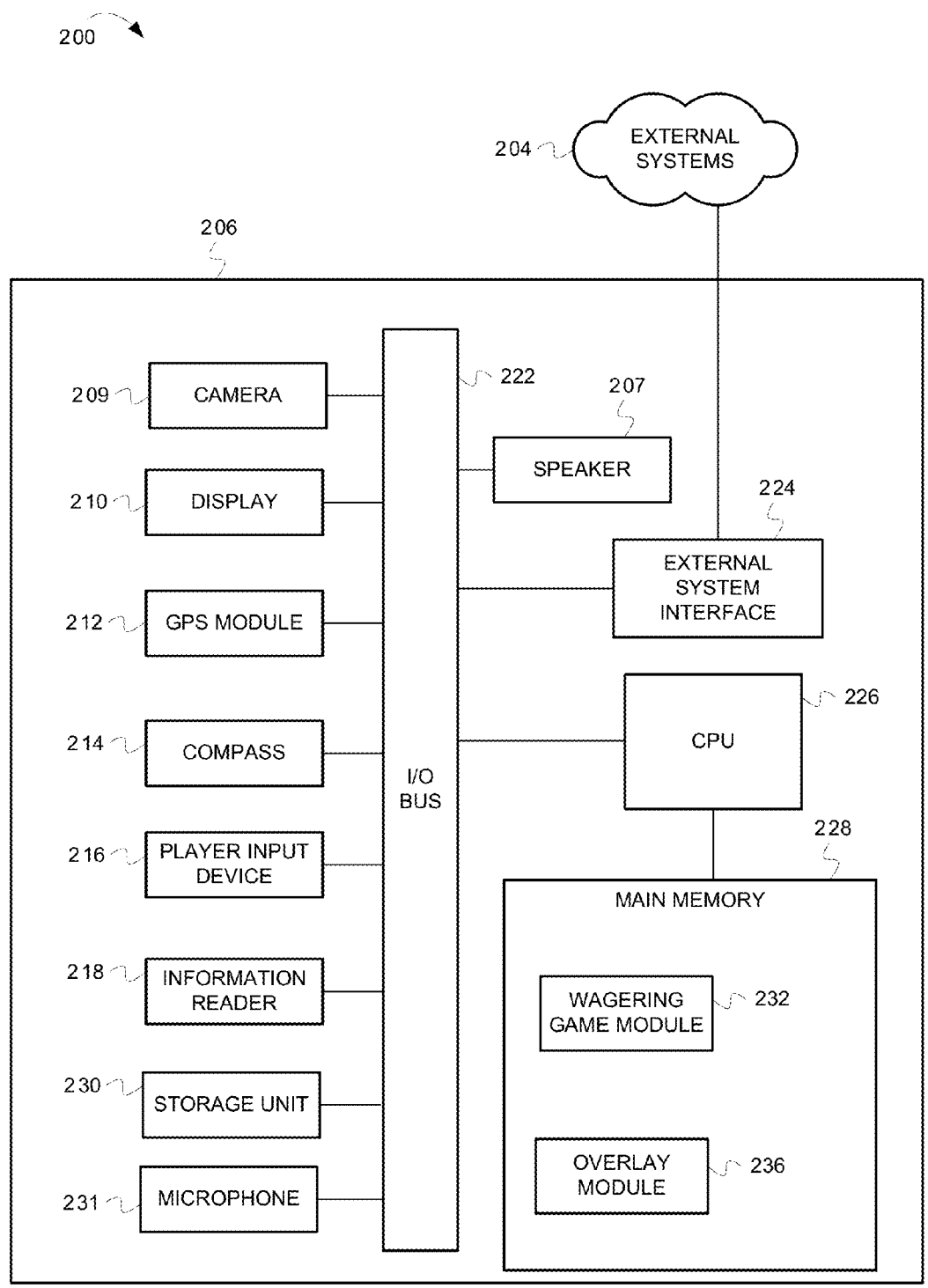
FIG. 2 is a block diagram illustrating a mobile device architecture, according to some example embodiments.

This section describes an example mobile device architecture and presents structural aspects of some embodiments. FIG. 2 is a block diagram illustrating a mobile device architecture, according to some example embodiments. As shown in FIG. 2, a mobile device architecture 200 includes a mobile device 206, which includes a central processing unit (CPU) 226 connected to a main memory 228. The CPU 226 can include any suitable processor, such as an Intel® Pentium processor, Intel® Core 2 Duo processor, AMD Opteron™ processor, or UltraSPARC processor. The main memory 228 includes a wagering game module 232 and an overlay module 236.

The CPU 226 is also connected to an input/output (I/O) bus 222, which can include any suitable bus technologies, such as an AGTL+ frontside bus and a PCI backside bus. The I/O bus 222 is connected to a camera 209, a speaker 207, a display 210, a Global Positioning System (GPS) module 212, a compass 214, a player input device 216, an information reader 218, a storage unit 230 and a microphone 231. The I/O bus 222 is also connected to an external system interface 224, which is connected to external systems 204 (e.g., backend servers). In some embodiments, an accelerometer is also connected to the bus 222.

In some embodiments, the mobile device 206 can include additional peripheral devices and/or more than one of each component shown in FIG. 2. For example, in one embodiment, the mobile device 206 can include multiple external system interfaces 224 and/or multiple CPUs 226. In one embodiment, any of the components can be integrated or subdivided.

In some embodiments, the wagering game module 232 can present wagering games, such as video poker, video blackjack, video slots, video lottery, etc., in whole or part. The overlay module 236 can capture different types of media content (e.g., image, video, audio, etc.) using different input/output components of the mobile device 206. Media content can include image content (e.g., files in JPEG format, TIFF format, GIF format, etc.), video content (e.g., files in MPEG format, QuickTime® format, MOV format, etc.), audio content (e.g., files in MP3 format, WAV format, etc.). The overlay module 236 can also determine an identification of the device, component, etc. (e.g., a wagering game machine) of which media content is being captured. For example, the overlay module 236 can capture an image of a wagering game table using the camera 209. The overlay module 236 can identify that the image is of a given wagering game among many tables in a wagering game establishment. In some example embodiments, the overlay module 236 uses the GPS module 212 to determine the position of the mobile device 206 at the time the media content is captured. Also, the overlay module 236 can use the compass 214 to determine the direction that a lens of the camera 209 was facing at the time the media content was captured.

Alternatively or in addition, the overlay module 236 can determine the position and direction of the mobile device 206 based on watermarks that are embedded in game elements, wagering game establishment signage, etc. The mobile device 206 can be used to capture screenshots of these different displays, signage, etc. having the embedded watermarks. The overlay module 236 can then perform optical character recognition of the screenshots. The overlay module 236 can then determine the embedded watermarks based on the optical character recognition. The overlay module 236 then decodes the embedded watermarks to identify the location. In particular, the decoded data provides a location of the display, signage, etc. in which the watermark is embedded. The overlay module 236 can then determine the position and direction of the mobile device 206 based on watermark(s) in one or more displays, signage, etc. Embodiments that use the embedded watermarks can be particularly useful in situations where a GPS signal cannot be received. Various combinations of GPS, a compass and embedded watermarking can be used to determine a location and a direction of the mobile device. For example, the embedded watermarking can be used to determine a location, while a compass is used to determine a direction. In another example, all three are used to provide a redundancy check on the proper location and direction.

Based on this position and direction, the overlay module 236 can then identify the object (e.g., the wagering game).

In some example embodiments, the overlay module 236 can then retrieve overlay imagery from different sources (e.g., backend servers, a wagering game machine, etc.) based on the component about which media content is captured. Different examples of components about which media content is captured and the different types of overlay imagery are described in more detail below. The overlay module 236 can output overlay media content through different output components of the mobile device 206. For example, the overlaid images or videos can be output to the display 210, and overlaid audio can be output to the speaker 207.

Any component described herein can include hardware, firmware, and/or machine-readable storage media including instructions for performing the operations described herein. Machine-readable storage media includes any mechanism that stores provides information in a form readable by a machine (e.g., a wagering game machine, computer, etc.). For example, machine-readable storage media includes read only memory (ROM), random access memory (RAM), magnetic disk storage media, optical storage media, flash memory machines, etc. Some embodiments include machine-readable signal media, which include any media suitable for transmitting software over a network (e.g., Ethernet media, fiber optic media, etc.).

Overlaid Media Content Examples

This section describes different overlay media content examples, according to some example embodiments. The examples include different types of objects that are captured in different media content. The examples also include different types of overlay imagery that can be superimposed onto the captured media content to form overlaid media content.

Game Information:

A first type of overlay media content that may be provided is a screenshot of a mobile device's display providing augmented reality that shows previous wagering game information for a wagering game table, according to some example embodiments. Examples of this type of content include the mobile device's display overlaying the rank and value of cards that are oriented face-down. Such an application could be particularly attractive in table games where there is a competitive element between the players and thus, maintaining secrecy of a hand is important. In such an arrangement the mobile device may read a watermark or other embedded content not indicative to a human, but resolvable to either the mobile device, game server, or both. In some example embodiments, there may be camera at the wagering game table providing the image to the mobile device, which is situated at some remote location relative to the table. This arrangement provides an additional benefit of enabling players to play remotely.

Additional examples of overlay content providing game information comprises information about the state of the wagering game, either in the past or in a present gaming session, or both. The overlay can provide details about certain wagers or zones on the wagering game table surface, such as "hot" or "cool" zones or winning or losing streaks. The overlay information may be descriptive of a particular player or position at the table. For example, the mobile device may use facial recognition or recognition of a player's player tracking card or betting device to identify a player and provide his wagering history or habits via the overlay content. Due to privacy concerns, it may be advantageous to anonymize such information and instead present the overlay content for a particular seat at a wagering game table or position relative to the dealer and/or other players.

The overlay content may also comprise audio media. In an example embodiment, the overlay content provided to the mobile device may offer "play-by-play" commentary particular to the identified wagering game. Additionally, the audio overlay content could provide communication between players or even from the casino operator to the player, such as celebrating a big win or offering encouragement after a "bad-beat."

Additional Game Content:

Another type of overlay media content that may be provided is a screenshot of a mobile device's display providing augmented reality that offers some additional wagering game opportunity, according to some example embodiments. Examples of this type of content include ad-hoc bets, proposition type bets, and exclusive side wagering bets offered by the casino operator. Real-time wagering opportunities afford the casino operator the opportunity to better tailor the wagering experience to each player, especially those with whom they maintain profile data for. Additionally, the ability to offer dynamic wagering opportunities may enhance the appeal of a traditional table game while adding another revenue stream for the operator. Since the offers can be triggered in real-time, the operator would have more control over the exposure that they may have at any one moment in time.

Additionally, the game content can offer progressive type awards to the player. For example, a standard poker table might be able to offer a progressive pay table for certain hands based off a video poker game. Such additional game content could entice players to remain in dealt hands though their initial hand may not have otherwise made them contemplate such a strategy.

In a blackjack table game, the overlay content could provide the opportunity to play session based prop bets. The mobile device could register a number of hands dealt and played and offer the player an additional wager based on the session of hands (e.g., will hit a blackjack, will not hit a blackjack, over/under on how many winning hands, etc.) In another embodiment, the overlay content could keep track of cards dealt before or after the player's option to take cards was exercised. Allowing the player to wager on these scenarios creates an alternate reality of how each hand can be played and introduces a meta-game on top of the traditional blackjack table game.

In yet another embodiment, the overlay content could provide the player the chance to roll "virtual dice" in a craps table game, even though they are not the current shooter. The virtual dice roll could also be made available to multiple players at the same table, thereby potentially introducing a head-to-head element to an otherwise standard community type table game.

Leveraging Device with Content:

An additional type of overlay media content that may be provided is a screenshot of a display of a mobile device providing augmented reality that provides additional functionality to a mobile device, according to some example embodiments. Example embodiments could include the ability for a group of players to conduct a dealer-less game, leveraging the peer-to-peer or distributed communication between mobile devices. By merely pointing the mobile device at a playing surface in a wagering game establishment, the mobile device may be enabled to provide overlay content for a table game that would otherwise require physical playing elements (e.g., cards, chips, dice, etc.) and/or a live dealer. Additional embodiments of overlaid game content not specifically tied to wagering on a physical table game include the ability for a player to be the "house" or bank for a virtual game, to wager off another player's play when there is not an open seat available at the table game or the player is remote to the game or desires not to sit at the table, and to use the mobile device as a keno game client while seated in a dining area of the casino property.

If the mobile device has an accelerometer, gyroscope, compass, or other similar orientation sensing ability, the overlay content can be tailored to reveal specific information based not only on the camera's recognition of the table game, but also the mobile device's position relative to the table game surface. For example, by pointing the mobile device at a wagering game table surface a "flashlight" effect can be mimicked where the overlaid content is actually certain areas of the table surface where the light was shone on it. In this example the overlaid content could reveal otherwise hidden content (e.g., hidden wagers, hidden game strategy tips, virtual assets, etc.)

If the mobile device has both a front-facing and rear-facing camera, not only can the mobile device collect recognition data from the camera facing the table game, but it could also collect recognition data from the user with the other camera. The data could then be used for account based wagering verification, responsible gaming initiatives, personalization, or casino security to enhance the overlaid content. Such authentication could allow the mobile device overlay to act as a wagering remote for making wagers or a digital dauber for certain games as the device could then be positively tied to the player and/or their account based wagering account.

The preceding embodiments may employ various screenshots, according to some example embodiments. The screenshots can include still images, motion video, animations, graphics, or any other indicia presentable on a display device. Moreover, any of the embodiments described vis-à-vis mobile devices can be implemented in non-mobile technologies, such as desktop computers, wagering game machines, etc. In some instances, stationary devices can utilize remote media capture devices to capture objects about which overlay imagery is presented.

Although the preceding examples utilize optical devices to capture media, other embodiments can use audio devices to capture media. For example, a mobile device can include an audio capture device that captures ambient sounds, or receives wirelessly receives audio content. In response to the captured audio content, the mobile device can present imagery associated with the captured audio content. For example, if the mobile device captures audio of a jackpot celebration (e.g., ringing bells, celebratory music, etc.), the mobile device can present imagery indicating the jackpot amount, time between jackpots, etc. Accordingly, the overlay module can process non-optical media and present imagery associated with such non-optical media.

Example Operations

This section describes operations associated with some example embodiments. In the discussion below, the flow diagrams are described with reference to the block diagrams presented above. However, in some example embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 3:
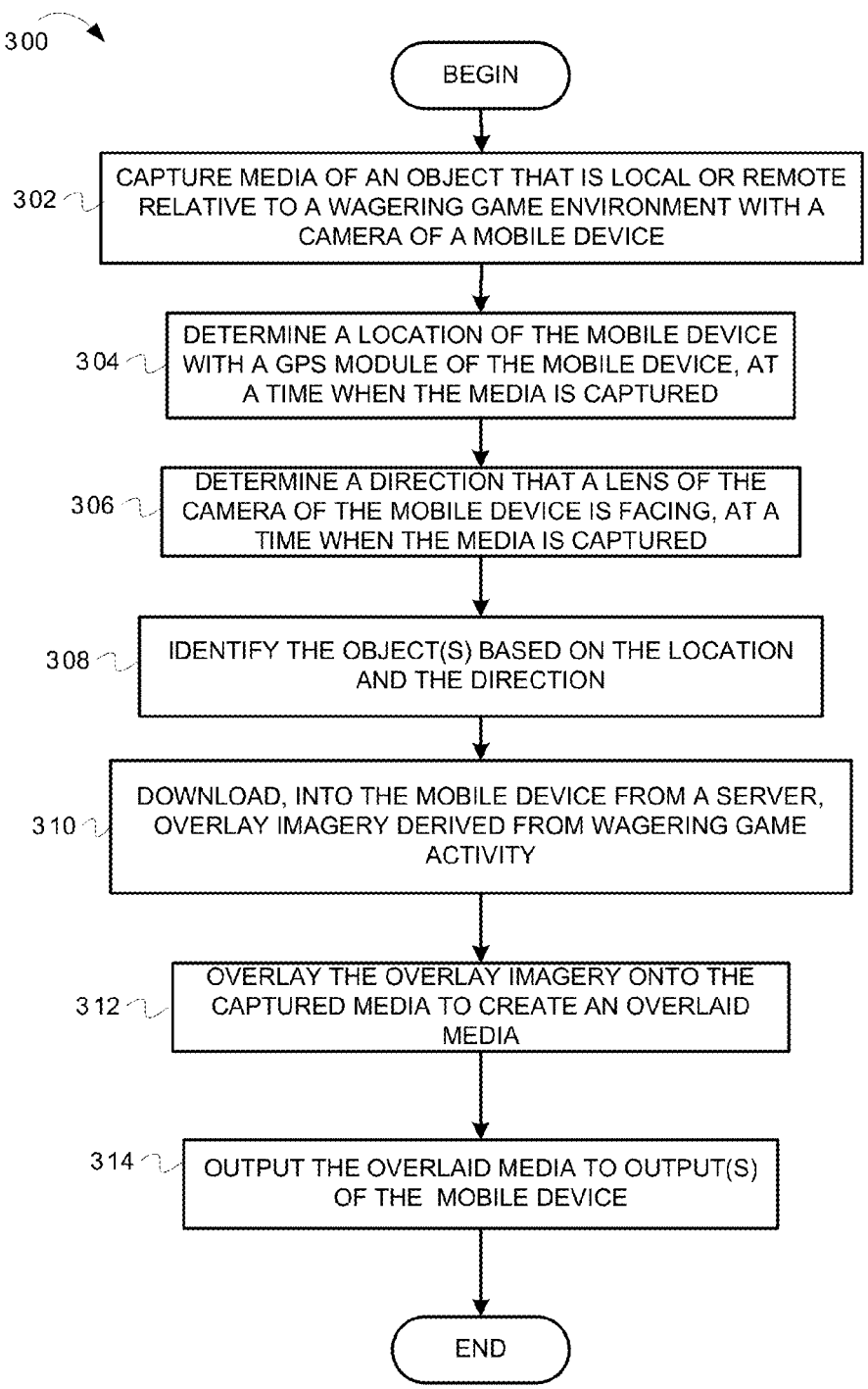
FIG. 3 is a flowchart of operations for augmented reality related to providing additional information for wagering game activity, according to some example embodiments.
Figure 4:
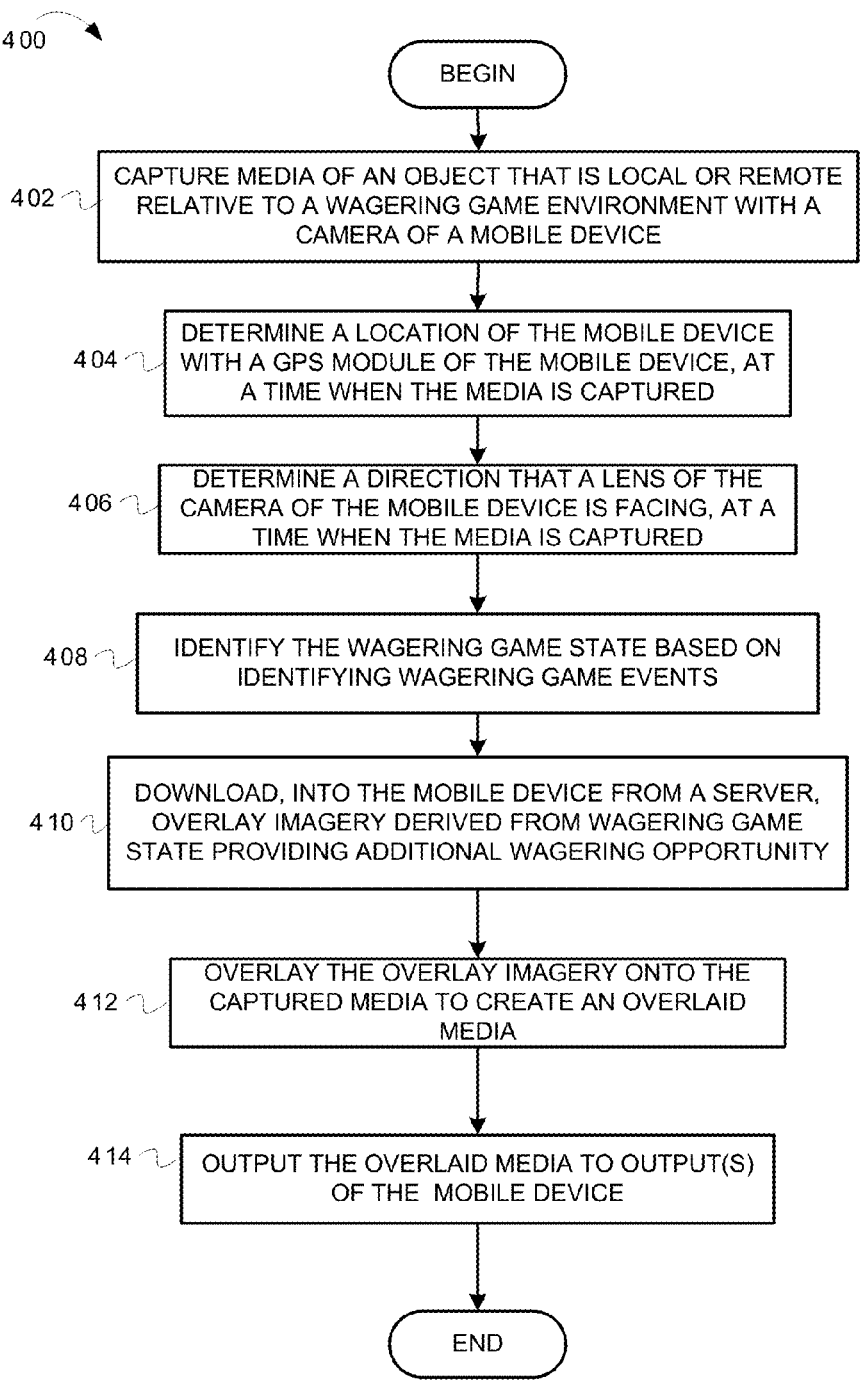
FIG. 4 is a flowchart of operations for augmented reality related to providing additional wagering activities, according to some example embodiments.
Figure 5:
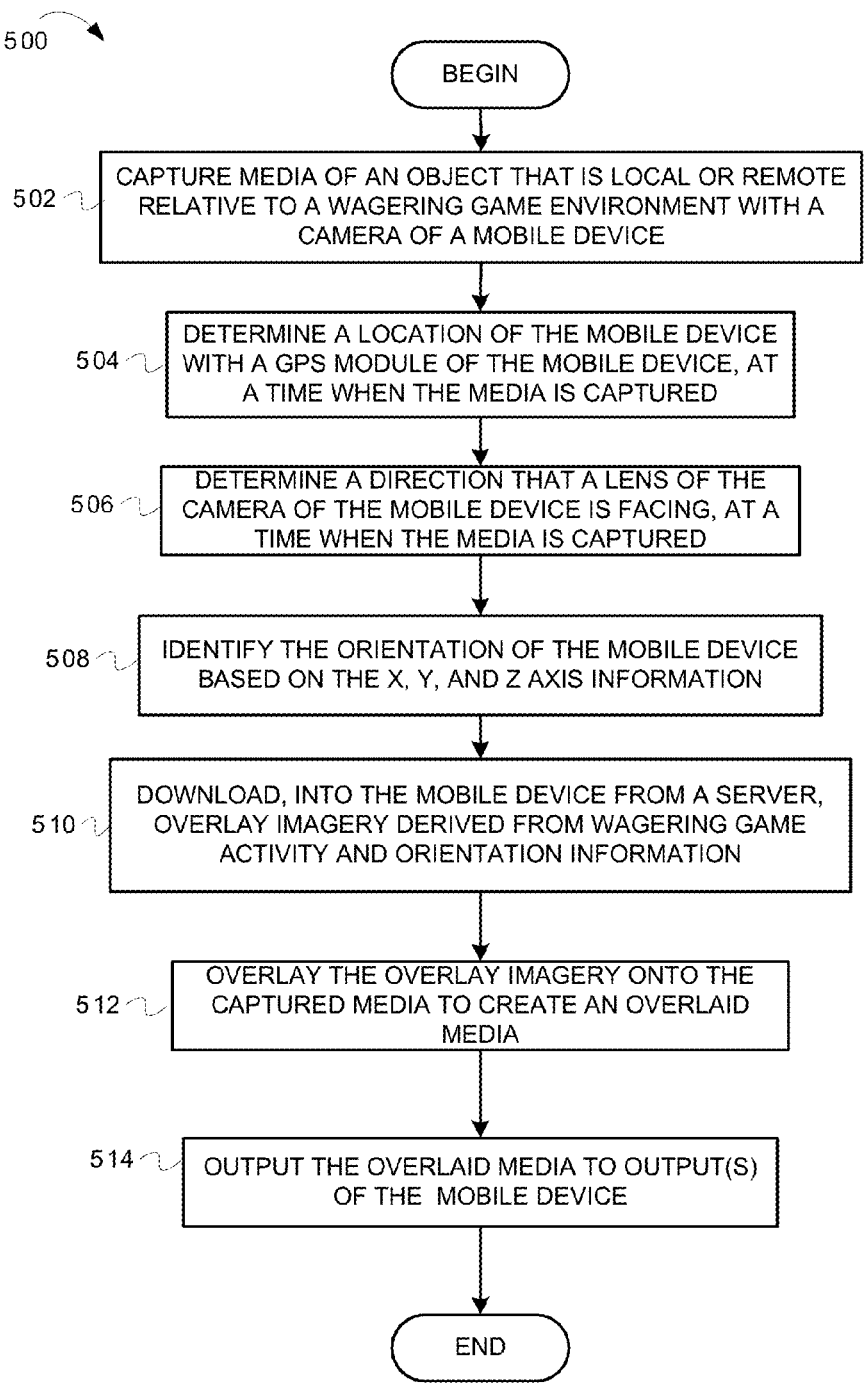
FIG. 5 is a flowchart of operations for augmented reality related to providing additional functionality to a mobile device, according to some example embodiments.

The section describes FIGS. 3-5. The discussion of FIG. 3 describes operations for augmented reality related to providing additional information for wagering game activity. The discussion of FIG. 4 describes operations for augmented reality related to providing additional wagering activities. The discussion of FIG. 5 describes operations for augmented reality related to providing additional functionality to a mobile device.

FIG. 3 is a flowchart of operations for augmented reality related to providing additional information for wagering game activity. A flow diagram 300 includes operations that, in some example embodiments, are performed by components of a mobile device. The flow diagram 300 is described with reference to the mobile device 206 of FIG. 2. The operations of the flow diagram 300 begin at block 302.

At block 302, the camera 209 of the mobile device 206 captures media content of an object that is local or remote to a wagering game environment. For example, the camera 209 can capture still images, video, or a combination thereof. Examples of objects being captured at a wagering game establishment include a wagering game table, cards, chips, dice, etc. These objects can also include wagering game players playing at the wagering game table. Operations continue at block 304.

At block 304, the GPS module 212 of mobile device 206 determines a location of the mobile device 206 at a time when the media content is captured by the camera 209. The GPS module 212 receives signals from a number of satellites orbiting around the Earth. The signals include data that indicates the satellite position and current time. Based on the satellite position and time when signals were sent from multiple satellites, the GPS module 212 can use trilateration to determine its location on the Earth. In some example embodiments, differential GPS is used, wherein the area has already been surveyed using a GPS. The GPS module 212 could determine the location of the mobile device 206 within that area. The overlay module 236 can then adjust the location captured by the GPS module 212 with the location data from the previous survey. Alternative or in addition to GPS locating, the location can be determined using a cellular infrastructure to triangulate the location of the mobile device. The overlay module 236 stores this location in the storage unit 230 and/or main memory 228 for subsequent processing. Operations continue at block 306.

At block 306, the compass 214 of the mobile device 206 determines a direction that a lens of the camera 209 of the mobile device 206 is facing at a time when the media content is captured by the camera 209. The overlay module 236 stores this direction in the storage unit 230 and/or main memory 228 for subsequent processing. Alternatively or in addition to determining the position and location of the mobile device 206 using GPS and a compass, the overlay module 236 can make this determination based on embedded watermarks in various wagering game displays, signage in the wagering game establishment, etc. (as described above). Operations continue at block 308.

At block 308, the overlay module 236 identifies the object(s) based on the location of the mobile device 206 and the direction that the lens of the camera 209 is facing at the time when the media content is captured by the camera 209. The overlay module 236 can determine the location of objects in the view of the lens of the camera 209 based on the location of the mobile device 206 and the direction of the lens. In some example embodiments, the overlay module 236 can transmit its location and direction to a backend server. The backend server can then return the identification of the viewable objects to the overlay module 236. In particular, the backend server stores the location of objects in the area (e.g., wagering game establishment). For example, the locations of the wagering game tables, structural aspects of the wagering game establishment (e.g., structural posts, walls, etc.), etc. are stored by the backend server. Accordingly, the backend server can return the identification of the objects in the viewable area (e.g., wagering game table). In addition, in some embodiments, image recognition can used to assist in determination of objects in the viewable area. Operations continue at block 310.

At block 310, the overlay module 236 downloads, into the mobile device 206 from a backend server, overlay imagery derived from wagering game activity. Various overlay imagery can be downloaded (as described above). For example, if the captured object comprises a wagering game table, the overlay imagery can include data regarding past wagering game activity for the particular wagering game table or for the particular players or positions at the table. Such past wagering game activity can identify game trends or hot or cold wagers. Returning to the flow diagram 300, operations continue at block 312.

At block 312, the overlay module 236 composites the overlay imagery onto the captured media content to create a composited media content. The composited media content can be various combinations of media content. For example, a still imagery (e.g., text, graphics, etc.) can be composited onto a video or a still image. In another example, video imagery can be composited onto a video or still image. In another example, a graphical user interface can be composited onto a video or still image to allow the user to enter information. While the media content has been described relative to visual media content, in some other embodiments, audio media content can be included as either or both the captured media content or part of the overlay imagery. For example, alternative to or in addition to a text message, an audio message can be played at speakers of the mobile device. Operations continue at block 314.

At block 314, the overlay module 236 outputs the overlaid media content to an output of the mobile device. For example, the overlay module 236 can output the visual overlaid media content to the display 210 and audible overlaid media content to the speaker 207. Alternatively or in addition, the overlay module 236 can output the overlaid media content to other devices. For example, the media content can be output to a display or speaker in an automobile, a television, a computer screen, etc. This output can occur through a wired or wireless communications between the mobile device 206 and the other device. The operations of the flow diagram 300 are complete.

FIG. 4 is a flowchart of operations for augmented reality related to providing additional wagering activities, according to some example embodiments. A flow diagram 400 includes operations that, in some example embodiments, are performed by components of a mobile device. The flow diagram 400 is described with reference to the mobile device 206 of FIG. 2. The operations of the flow diagram 400 begin at block 402.

At block 402, the camera 209 of the mobile device 206 captures media content of an object that is local or remote to a wagering game environment. For example, the camera 209 can capture still images, video, or a combination thereof. Examples of objects being captured at a wagering game establishment include a wagering game table, cards, chips, dice, etc. These objects can also include wagering game players playing at the wagering game table. Operations continue at block 404.

At block 404, the GPS module 212 of mobile device 206 determines a location of the mobile device 206 at a time when the media content is captured by the camera 209. The GPS module 212 receives signals from a number of satellites orbiting around the Earth. The signals include data that indicates the satellite position and current time. Based on the satellite position and time when signals were sent from multiple satellites, the GPS module 212 can use trilateration to determine its location on the Earth. In some example embodiments, differential GPS is used, wherein the area has already been surveyed using a GPS. The GPS module 212 could determine the location of the mobile device 206 within that area. The overlay module 236 can then adjust the location captured by the GPS module 212 with the location data from the previous survey. Alternative or in addition to GPS locating, the location can be determined using a cellular infrastructure to triangulate the location of the mobile device. The overlay module 236 stores this location in the storage unit 230 and/or main memory 228 for subsequent processing. Operations continue at block 406.

At block 406, the compass 214 of the mobile device 206 determines a direction that a lens of the camera 209 of the mobile device 206 is facing at a time when the media content is captured by the camera 209. The overlay module 236 stores this direction in the storage unit 230 and/or main memory 228 for subsequent processing. Alternatively or in addition to determining the position and location of the mobile device 206 using GPS and a compass, the overlay module 236 can make this determination based on embedded watermarks in various wagering game displays, signage in the wagering game establishment, etc. (as described above). Operations continue at block 408.

At block 408, the overlay module 236 identifies the wagering game state based on wagering game events identified in the media content captured by the camera 209. In some example embodiments, the overlay module 236 can transmit the wagering game state to a backend server. The backend server can then return the likelihood of future game events to the overlay module 236. In particular, the backend server stores the relevant statistical information for the wagering games. Accordingly, the backend server can return the potential additional wagering opportunities to the overlay module. Operations continue at block 410.

At block 410, the overlay module 236 downloads, into the mobile device 206 from a backend server, overlay imagery derived from wagering game state. Various overlay imagery can be downloaded (as described above). For example, if the captured object comprises a wagering game table, the overlay imagery may comprise ad-hoc wagering opportunities, exclusive wagers, progressive paytables, and session-based and other proposition type bets. Returning to the flow diagram 400, operations continue at block 412.

At block 412, the overlay module 236 composites the overlay imagery onto the captured media content to create a composited media content. The composited media content can be various combinations of media content. For example, a still imagery (e.g., text, graphics, etc.) can be composited onto a video or a still image. In another example, video imagery can be composited onto a video or still image. In another example, a graphical user interface can be composited onto a video or still image to allow the user to enter information. While the media content has been described relative to visual media content, in some other embodiments, audio media content can be included as either or both the captured media content or part of the overlay imagery. For example, alternative to or in addition to a text message, an audio message can be played at speakers of the mobile device. Operations continue at block 414.

At block 414, the overlay module 236 outputs the overlaid media content to an output of the mobile device. For example, the overlay module 236 can output the visual overlaid media content to the display 210 and audible overlaid media content to the speaker 207. Alternatively or in addition, the overlay module 236 can output the overlaid media content to other devices. For example, the media content can be output to a display or speaker in an automobile, a television, a computer screen, etc. This output can occur through a wired or wireless communications between the mobile device 206 and the other device. The operations of the flow diagram 400 are complete.

FIG. 5 is a flowchart of operations for augmented reality related to providing additional functionality to a mobile device. The flow diagram 500 is described with reference to the mobile device 206 of FIG. 2. The operations of the flow diagram 500 begin at block 502.

At block 502, the camera 209 of the mobile device 206 captures media content of an object that is local or remote to a wagering game environment. For example, the camera 209 can capture still images, video, or a combination thereof. Examples of objects being captured at a wagering game establishment include a wagering game table, cards, chips, dice, etc. These objects can also include wagering game players playing at the wagering game table. Operations continue at block 504.

At block 504, the GPS module 212 of mobile device 206 determines a location of the mobile device 206 at a time when the media content is captured by the camera 209. The GPS module 212 receives signals from a number of satellites orbiting around the Earth. The signals include data that indicates the satellite position and current time. Based on the satellite position and time when signals were sent from multiple satellites, the GPS module 212 can use trilateration to determine its location on the Earth. In some example embodiments, differential GPS is used, wherein the area has already been surveyed using a GPS. The GPS module 212 could determine the location of the mobile device 206 within that area. The overlay module 236 can then adjust the location captured by the GPS module 212 with the location data from the previous survey. Alternative or in addition to GPS locating, the location can be determined using a cellular infrastructure to triangulate the location of the mobile device. The overlay module 236 stores this location in the storage unit 230 and/or main memory 228 for subsequent processing. Operations continue at block 506.

At block 506, the compass 214 of the mobile device 206 determines a direction that a lens of the camera 209 of the mobile device 206 is facing at a time when the media content is captured by the camera 209. The overlay module 236 stores this direction in the storage unit 230 and/or main memory 228 for subsequent processing. Alternatively or in addition to determining the position and location of the mobile device 206 using GPS and a compass, the overlay module 236 can make this determination based on embedded watermarks in various wagering game displays, signage in the wagering game establishment, etc. (as described above). Operations continue at block 508.

At block 508, the overlay module 236 identifies the orientation of the mobile device based on x, y, and z axis information of the mobile device 206. The backend server can then return the hidden content to the overlay module 236. In particular, the backend server stores the location of "hidden" areas on the wagering game table surface. Accordingly, the backend server can return the identification of the hidden objects in the viewable area (e.g., wagering game table). Operations continue at block 510.

At block 510, the overlay module 236 downloads, into the mobile device 206 from a backend server, overlay imagery derived from wagering game activity. Various overlay imagery can be downloaded (as described above). For example, if the captured object comprises a wagering game table, the overlay imagery can include hidden wagering opportunities, hidden game strategy clues, or hidden virtual assets. Returning to the flow diagram 300, operations continue at block 512.

At block 512, the overlay module 236 composites the overlay imagery onto the captured media content to create a composited media content. The composited media content can be various combinations of media content. For example, a still imagery (e.g., text, graphics, etc.) can be composited onto a video or a still image. In another example, video imagery can be composited onto a video or still image. In another example, a graphical user interface can be composited onto a video or still image to allow the user to enter information. While the media content has been described relative to visual media content, in some other embodiments, audio media content can be included as either or both the captured media content or part of the overlay imagery. For example, alternative to or in addition to a text message, an audio message can be played at speakers of the mobile device. Operations continue at block 514.

At block 514, the overlay module 236 outputs the overlaid media content to an output of the mobile device. For example, the overlay module 236 can output the visual overlaid media content to the display 210 and audible overlaid media content to the speaker 207. Alternatively or in addition, the overlay module 236 can output the overlaid media content to other devices. For example, the media content can be output to a display or speaker in an automobile, a television, a computer screen, etc. This output can occur through a wired or wireless communications between the mobile device 206 and the other device. The operations of the flow diagram 500 are complete.

Operating Environment

This section describes an example operating environment and presents structural aspects of some embodiments. This section includes discussion about wagering game machine architectures and wagering game networks.

Wagering Game Machine Architectures

Figure 6:
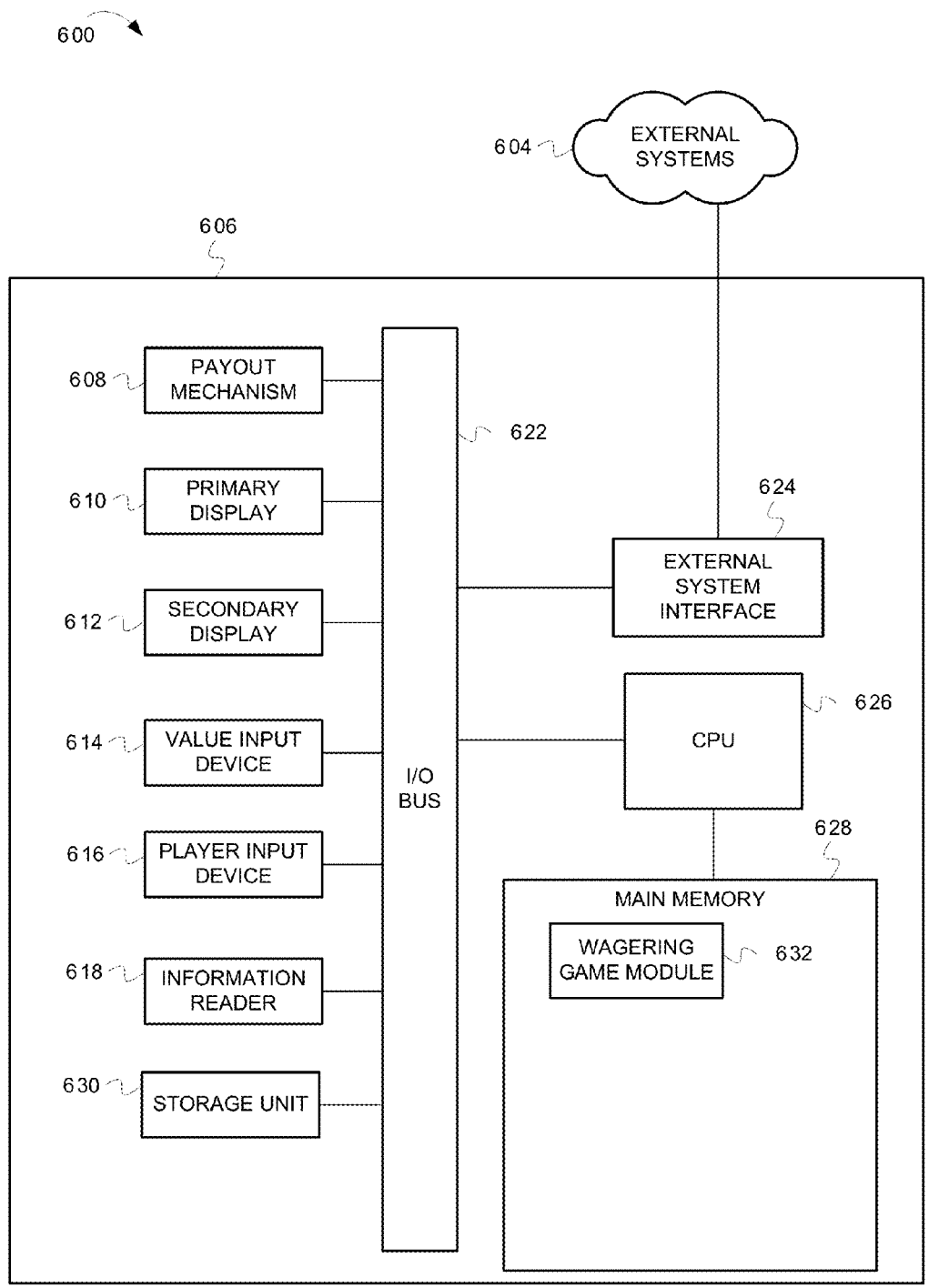
FIG. 6 is a block diagram illustrating a wagering game machine architecture, according to some example embodiments.

FIG. 6 is a block diagram illustrating a wagering game machine architecture, according to some example embodiments. As shown in FIG. 6, the wagering game machine architecture 600 includes a wagering game machine 606, which includes a central processing unit (CPU) 626 connected to main memory 628. The CPU 626 can include any suitable processor, such as an Intel® Pentium processor, Intel® Core 2 Duo processor, AMD Opteron™ processor, or UltraSPARC processor. The main memory 628 includes a wagering game unit 632. In one embodiment, the wagering game unit 632 can present wagering games, such as video poker, video black jack, video slots, video lottery, etc., in whole or part.

The CPU 626 is also connected to an input/output (I/O) bus 622, which can include any suitable bus technologies, such as an AGTL+ frontside bus and a PCI backside bus. The I/O bus 622 is connected to a payout mechanism 608, primary display 610, secondary display 612, value input device 614, player input device 616, information reader 618, and storage unit 630. The player input device 616 can include the value input device 614 to the extent the player input device 616 is used to place wagers. The I/O bus 622 is also connected to an external system interface 624, which is connected to external systems 604 (e.g., wagering game networks).

In one embodiment, the wagering game machine 606 can include additional peripheral devices and/or more than one of each component shown in FIG. 6. For example, in one embodiment, the wagering game machine 606 can include multiple external system interfaces 624 and/or multiple CPUs 626. In one embodiment, any of the components can be integrated or subdivided.

Any component of the architecture 600 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 6 describes an example wagering game machine architecture, this section continues with a discussion wagering game networks.

Wagering Game Networks

Figure 7:
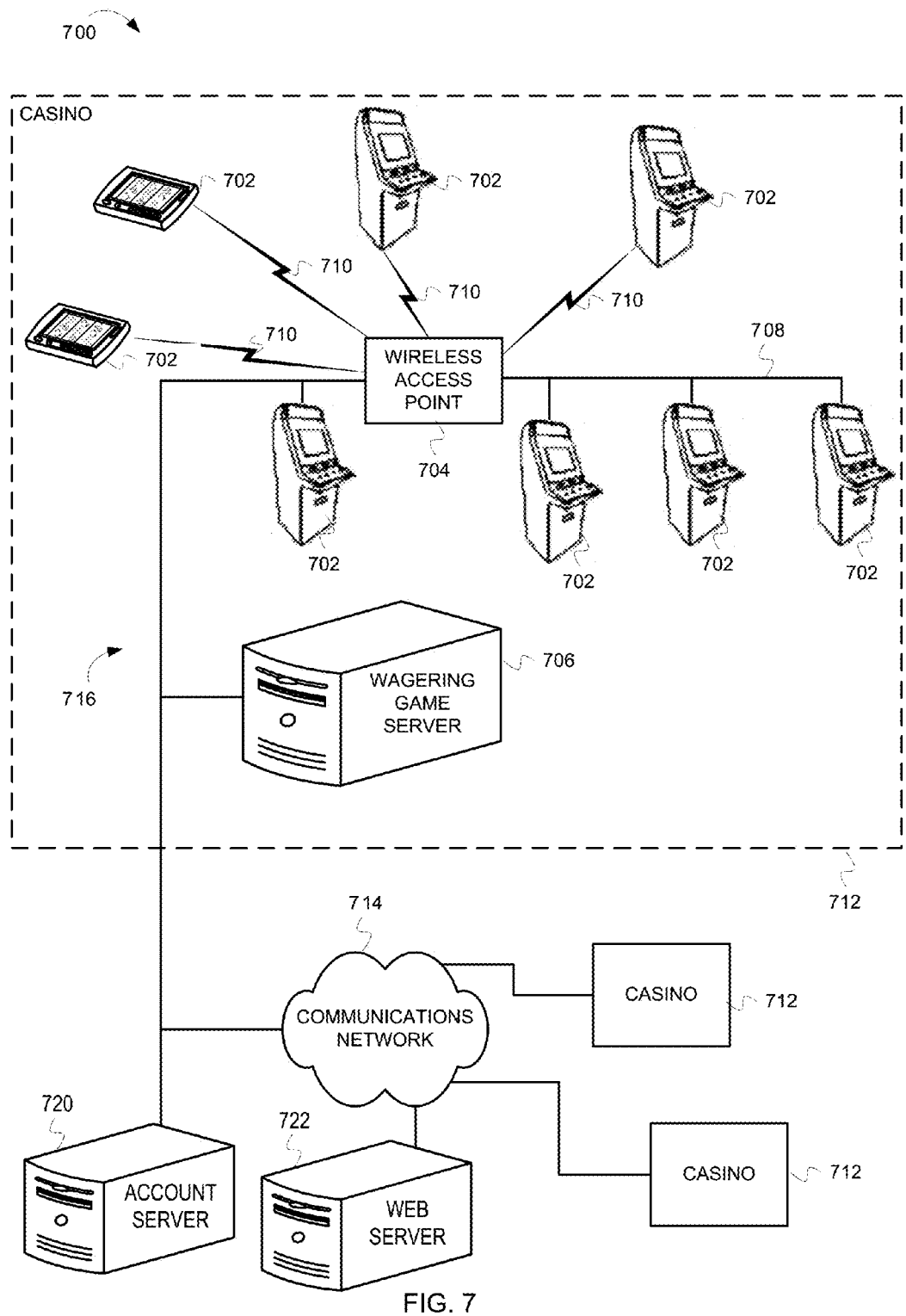
FIG. 7 is a block diagram illustrating a wagering game network, according to some example embodiments.

FIG. 7 is a block diagram illustrating a wagering game network 700, according to some example embodiments. As shown in FIG. 7, the wagering game network 700 includes a plurality of casinos 712 connected to a communications network 714.

Each casino 712 includes a local area network 716, which includes an access point 704, a wagering game server 706, and wagering game machines 702. The access point 704 provides wireless communication links 710 and wired communication links 708. The wired and wireless communication links can employ any suitable connection technology, such as Bluetooth, 802.11, Ethernet, public switched telephone networks, SONET, etc. In some embodiments, the wagering game server 706 can serve wagering games and distribute content to devices located in other casinos 712 or at other locations on the communications network 714.

The wagering game machines 702 described herein can take any suitable form, such as floor standing models, handheld mobile units, bartop models, workstation-type console models, etc. Further, the wagering game machines 702 can be primarily dedicated for use in conducting wagering games, or can include non-dedicated devices, such as mobile phones, personal digital assistants, personal computers, etc. In one embodiment, the wagering game network 700 can include other network devices, such as accounting servers, wide area progressive servers, player tracking servers, and/or other devices suitable for use in connection with embodiments of the invention.

In some embodiments, wagering game machines 702 and wagering game servers 706 work together such that a wagering game machine 702 can be operated as a thin, thick, or intermediate client. For example, one or more elements of game play may be controlled by the wagering game machine 702 (client) or the wagering game server 706 (server). Game play elements can include executable game code, lookup tables, configuration files, game outcome, audio or visual representations of the game, game assets or the like. In a thin-client example, the wagering game server 706 can perform functions such as determining game outcome or managing assets, while the wagering game machine 702 can present a graphical representation of such outcome or asset modification to the user (e.g., player). In a thick-client example, the wagering game machines 702 can determine game outcomes and communicate the outcomes to the wagering game server 706 for recording or managing a player's account.

In some embodiments, either the wagering game machines 702 (client) or the wagering game server 706 can provide functionality that is not directly related to game play. For example, account transactions and account rules may be managed centrally (e.g., by the wagering game server 706) or locally (e.g., by the wagering game machine 702). Other functionality not directly related to game play may include power management, presentation of advertising, software or firmware updates, system quality or security checks, etc.

Any of the wagering game network components (e.g., the wagering game machines 702) can include hardware and machine-readable media including instructions for performing the operations described herein.

Example Wagering Game Machines

Figure 8:
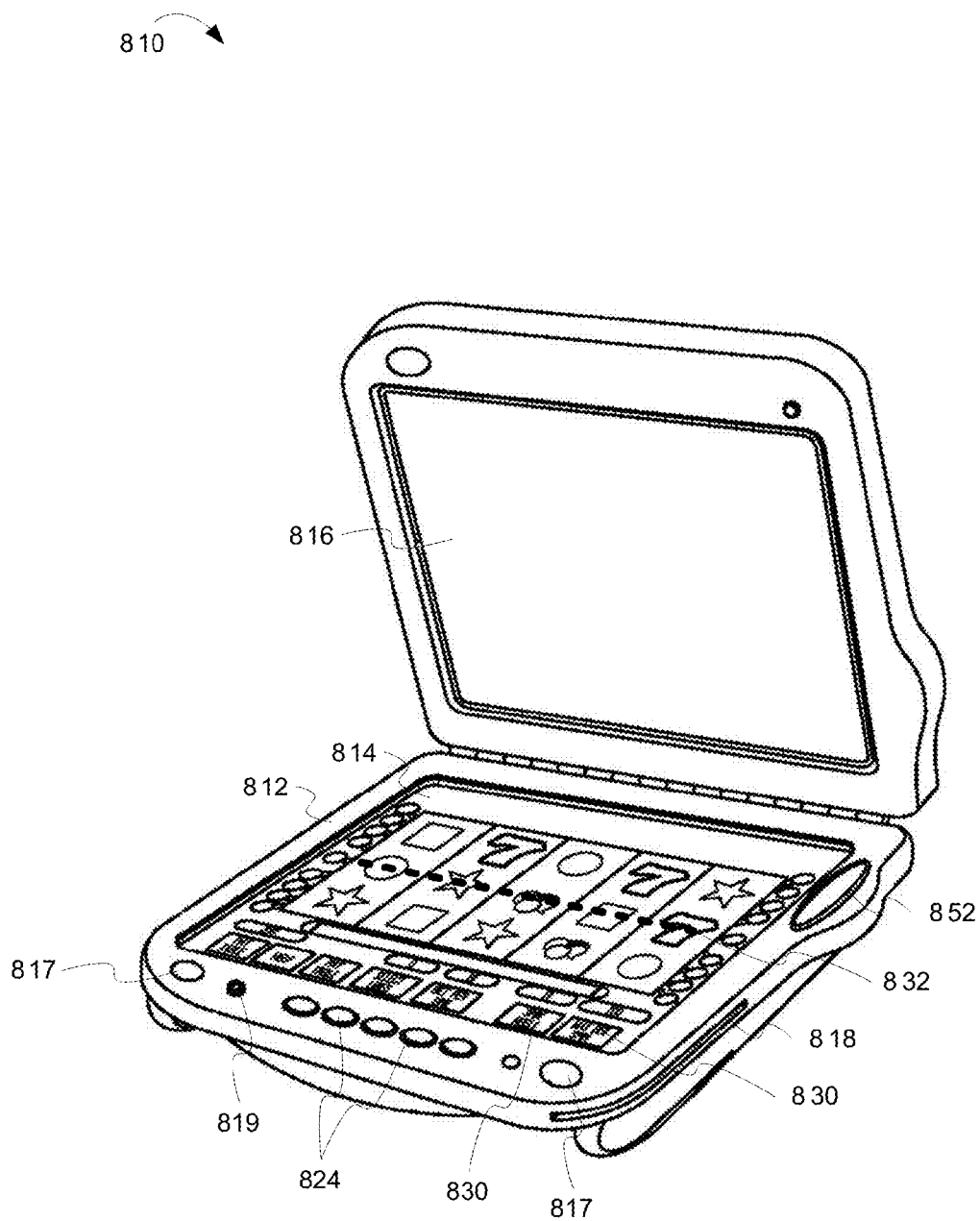
FIG. 8 is a perspective view of a portable wagering game terminal, according to some example embodiments.

FIG. 8 shows an example embodiment of a wagering game machine 810. Like free standing wagering game machines, in a handheld or mobile form, the wagering game machine 810 can include any suitable electronic device configured to play a video casino games such as blackjack, slots, keno, poker, blackjack, and roulette. The wagering game machine 810 comprises a housing 812 and includes input devices, including a value input device 818 and a player input device 824. For output, the wagering game machine 810 includes a primary display 814, a secondary display 816, one or more speakers 817, one or more player-accessible ports 819 (e.g., an audio output jack for headphones, a video headset jack, etc.), and other conventional I/O devices and ports, which may or may not be player-accessible. In the embodiment depicted in FIG. 8, the wagering game machine 810 comprises a secondary display 816 that is rotatable relative to the primary display 814. The optional secondary display 816 can be fixed, movable, and/or detachable/attachable relative to the primary display 814. Either the primary display 814 and/or secondary display 816 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 818 can comprise, for example, a slot located on the front, side, or top of the casing 812 configured to receive credit from a stored-value card (e.g., casino card, smart card, debit card, credit card, etc.) inserted by a player. The player-accessible value input device 818 can also comprise a sensor (e.g., an RF sensor) configured to sense a signal (e.g., an RF signal) output by a transmitter (e.g., an RF transmitter) carried by a player. The player-accessible value input device 818 can also or alternatively include a ticket reader, or barcode scanner, for reading information stored on a credit ticket, a card, or other tangible portable credit or funds storage device. The credit ticket or card can also authorize access to a central account, which can transfer money to the wagering game machine 810.

Still other player-accessible value input devices 818 can require the use of touch keys 830 on the touch-screen display (e.g., primary display 814 and/or secondary display 816) or player input devices 824. Upon entry of player identification information and, preferably, secondary authorization information (e.g., a password, PIN number, stored value card number, predefined key sequences, etc.), the player can be permitted to access a player's account. As one potential optional security feature, the wagering game machine 810 can be configured to permit a player to only access an account the player has specifically set up for the wagering game machine 810. Other conventional security features can also be utilized to, for example, prevent unauthorized access to a player's account, to minimize an impact of any unauthorized access to a player's account, or to prevent unauthorized access to any personal information or funds temporarily stored on the wagering game machine 810.

The player-accessible value input device 818 can itself comprise or utilize a biometric player information reader which permits the player to access available funds on a player's account, either alone or in combination with another of the aforementioned player-accessible value input devices 818. In an embodiment wherein the player-accessible value input device 818 comprises a biometric player information reader, transactions such as an input of value to the wagering game machine 810, a transfer of value from one player account or source to an account associated with the wagering game machine 810, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 818 comprising a biometric player information reader can require a confirmatory entry from another biometric player information reader 852, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 818 can be provided remotely from the wagering game machine 810.

The player input device 824 comprises a plurality of push buttons on a button panel for operating the wagering game machine 810. In addition, or alternatively, the player input device 824 can comprise a touch screen mounted to a primary display 814 and/or secondary display 816. In one aspect, the touch screen is matched to a display screen having one or more selectable touch keys 830 selectable by a user's touching of the associated area of the screen using a finger or a tool, such as a stylus pointer. A player enables a desired function either by touching the touch screen at an appropriate touch key 830 or by pressing an appropriate push button on the button panel. The touch keys 830 can be used to implement the same functions as push buttons. Alternatively, the push buttons 826 can provide inputs for one aspect of the operating the game, while the touch keys 830 can allow for input needed for another aspect of the game. The various components of the wagering game machine 810 can be connected directly to, or contained within, the casing 812, as seen in FIG. 8, or can be located outside the casing 812 and connected to the casing 812 via a variety of wired (tethered) or wireless connection methods. Thus, the wagering game machine 810 can comprise a single unit or a plurality of interconnected (e.g., wireless connections) parts which can be arranged to suit a player's preferences.

The operation of the basic wagering game on the wagering game machine 810 is displayed to the player on the primary display 814. The primary display 814 can also display the bonus game associated with the basic wagering game. The primary display 814 preferably takes the form of a high resolution LCD, a plasma display, an LED, or any other type of display suitable for use in the wagering game machine 810. The size of the primary display 814 can vary from, for example, about a 2-3" display to a 15" or 17" display. In at least some embodiments, the primary display 814 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 814 and/or secondary display 816 can have a 16:9 aspect ratio or other aspect ratio (e.g., 4:3). The primary display 814 and/or secondary display 816 can also each have different resolutions, different color schemes, and different aspect ratios.

As with the free standing embodiments a wagering gaming machine, a player begins play of the basic wagering game on the wagering game machine 810 by making a wager (e.g., via the value input device 818 or an assignment of credits stored on the handheld gaming machine via the touch screen keys 830, player input device 824, or buttons 826) on the wagering game machine 810. In some embodiments, the basic game can comprise a plurality of symbols arranged in an array, and includes at least one payline 832 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 818 of the wagering game machine 810 can double as a player information reader 852 that allows for identification of a player by reading a card with information indicating the player's identity (e.g., reading a player's credit card, player ID card, smart card, etc.). The player information reader 852 can alternatively or also comprise a bar code scanner, RFID transceiver or computer readable storage medium interface. In one embodiment, the player information reader 852 comprises a biometric sensing device.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A computerized method comprising:
capturing media content of a wagering game table at a wagering game establishment with a camera of a mobile device;
determining, by the mobile device, a location of the mobile device when the media content is captured;
determining, by the mobile device, a direction that a lens of the camera is facing when the media content is captured;
identifying the wagering game table based on the location and the direction;
determining past wagering game activity on the wagering game table;
determining overlay imagery based on the past wagering game activity of the wagering game table;
compositing the overlay imagery with the media content to create a composited media content; and
displaying the composited media content on a display of the mobile device.

2. The computerized method of claim 1, wherein determining the direction of the lens of the camera comprises using pattern recognition to identify fiducial markers within the media content.

3. The computerized method of claim 1, wherein determining the location of the mobile device comprises at least one of: determining the location of the mobile device with a global positioning system module of the mobile device, determining the location of the mobile device using a cellular infrastructure to triangulate the location of the mobile device, or determining the location of the mobile device using pattern recognition to identify fiducial markers within the media content.

4. The computerized method of claim 1, wherein determining the location of the mobile device and determining the direction of the lens comprises:
using a field-recognition algorithm employing lines and patterns distributed throughout the wagering game establishment to construct a camera-relative virtual space independent of absolute device position and lens orientation.

5. The computerized method of claim 1, wherein the overlay imagery is derived from at least one of past wagering game activity of a user of the mobile device or a statistic of past wagering game activity the wagering game table.

6. The computerized method of claim 5, wherein the wagering game activity comprises past wagering game activity of the user of the mobile device, wherein the past wagering game activity is retrieved from a player tracking account provided by the wagering game establishment.

7. The computerized method of claim 1, wherein the overlay imagery is derived from a suggestion to make one or more wagers of the wagering game table based on a statistic of past wagering game activity of the one or more wagering game tables.

8. The computerized method of claim 1, wherein the overlay imagery comprises an interface to enable a user of the mobile device to recognize a hidden attribute of a game element of the one or more wagering game tables.

9. A non-transitory machine readable medium including instructions that when executed by one or more processors cause the one or more processor to perform operations to display media content on a mobile device, the instructions comprising:
instructions to capture media content of a wagering game table at a wagering game establishment with a camera of a mobile device;
instructions to determine, by the mobile device, a location of the mobile device when the media content is captured;
instructions to determine, by the mobile device, a direction that a lens of the camera is facing when the media content is captured;
instructions to identify the wagering game table based on the location and the direction;
instructions to determine past wagering game activity on the wagering game table;
instructions to determine overlay imagery based on the past wagering game activity of the wagering game table;
instructions to composite the overlay imagery onto the media content to create a composited media content; and
instructions to display the composited media content on a display of the mobile device.

10. The non-transitory machine readable medium of claim 9, wherein the instructions to determine the direction of the lens of the camera comprise instructions to use pattern recognition to identify fiducial markers within the media content.

11. The non-transitory machine readable medium of claim 9, wherein the instructions to determine the location of the mobile device comprise at least one of: instructions to determine the location of the mobile device with a global positioning system module of the mobile device, instructions to determine the location of the mobile device using a cellular infrastructure to triangulate the location of the mobile device, or instructions to determine the location of the mobile device using pattern recognition to identify fiducial markers within the media content.

12. The non-transitory machine readable medium of claim 9, wherein the instructions to determine the location of the mobile device and determine the direction of the lens comprises:
instructions to use a field-recognition algorithm employing lines and patterns distributed throughout the wagering game establishment to construct a camera-relative virtual space independent of absolute device position and lens orientation.

13. The non-transitory machine readable medium of claim 9, wherein the overlay imagery is derived from at least one of past wagering game activity of a user of the mobile device or a statistic of past wagering game activity of the wagering game table.

14. The non-transitory machine readable medium of claim 9, wherein the wagering game activity comprises past wagering game activity of the user of the mobile device, wherein the past wagering game activity is retrieved from a player tracking account provided by the wagering game establishment.

15. The non-transitory machine readable medium of claim 9, wherein the overlay imagery is derived from a suggestion to make one or more wagers of the wagering game table based on a statistic of past wagering game activity of the one or more wagering game tables.

16. The non-transitory machine readable medium of claim 9, wherein the overlay imagery comprises an interface to enable a user of the mobile device to recognize a hidden attribute of a game element of the one or more wagering game tables.

17. A mobile device comprising:
one or more processors;
a camera connected to the one or more processors, the camera including a lens;
one or more non-transitory machine readable media including instructions that when executed by one or more processors cause the one or more processors to perform operations for presenting media, the instructions comprising:
instructions to capture media content of a wagering game table at a wagering game establishment with the camera;
instructions to determine a location of the mobile device when the media content is captured;
instructions to determine a direction that the lens of the camera is facing when the media content is captured;
instructions to identify the wagering game table based on the location and the direction;
instructions to determine past wagering game activity on the wagering game table;
instructions to determine overlay imagery based on the past wagering game activity of the wagering game table;
instructions to composite the overlay imagery onto the media content to create a composited media content; and
instructions to display the composited media content on a display of the mobile device.

18. The mobile device of claim 17, wherein the instructions to determine the direction of the lens of the camera comprise instructions to use pattern recognition to identify fiducial markers within the media content.

19. The mobile device of claim 17, wherein the instructions to determine the location of the mobile device comprises at least one of: instructions to determine the location of the mobile device with a global positioning system module of the mobile device, instructions to determine the location of the mobile device using a cellular infrastructure to triangulate the location of the mobile device, or instructions to determine the location of the mobile device using pattern recognition to identify fiducial markers within the media content.

* * * * *